(12) United States Patent
Leman et al.

(10) Patent No.: US 10,277,150 B2
(45) Date of Patent: Apr. 30, 2019

(54) METHOD AND CIRCUIT FOR DRIVING SINGLE COIL BLDC MOTOR

(71) Applicant: Melexis Bulgaria Ltd., Sofia (BG)

(72) Inventors: Dirk Leman, Lier (BE); Rumen Marinov Peev, Sofia (BG); Petko Nedelev, Sofia (BG)

(73) Assignee: Melexis Bulgaria Ltd, Sofia (BG)

( * ) Notice: Subject to any disclaimer, the term of this patent is extended or adjusted under 35 U.S.C. 154(b) by 0 days.

(21) Appl. No.: 15/848,195

(22) Filed: Dec. 20, 2017

(65) Prior Publication Data

US 2018/0175756 A1 Jun. 21, 2018

(30) Foreign Application Priority Data

Dec. 20, 2016 (EP) ..................................... 16205471

(51) Int. Cl.
| | |
|---|---|
| *H02P 6/06* | (2006.01) |
| *H02P 6/26* | (2016.01) |
| *H02P 6/182* | (2016.01) |
| *H02P 6/16* | (2016.01) |
| *H02P 7/03* | (2016.01) |

(52) U.S. Cl.
CPC .................. *H02P 6/26* (2016.02); *H02P 6/16* (2013.01); *H02P 6/182* (2013.01); *H02P 7/04* (2016.02)

(58) Field of Classification Search
USPC ...... 318/400.03, 790, 252, 127, 128, 400.16
See application file for complete search history.

(56) References Cited

U.S. PATENT DOCUMENTS

| | | | |
|---|---|---|---|
| 6,900,604 B2* | 5/2005 | Kokami | H02P 6/182 318/400.33 |
| 7,639,064 B2 | 12/2009 | Hsiao et al. | |
| 9,018,873 B2* | 4/2015 | Ogawa | H02P 6/16 318/400.19 |
| 2004/0008002 A1* | 1/2004 | Kamio | G05B 19/4062 318/701 |
| 2008/0018194 A1 | 1/2008 | Kakugawa et al. | |
| 2009/0240389 A1* | 9/2009 | Nomura | B62D 5/046 701/31.4 |
| 2011/0181214 A1 | 7/2011 | Nakahata et al. | |
| 2017/0141709 A1* | 5/2017 | Fukuda | F25B 49/025 |

FOREIGN PATENT DOCUMENTS

EP 3059852 A1 8/2016

OTHER PUBLICATIONS

Extended European Search Report from EP Application No. EP 16205471, dated Jun. 21, 2017.

* cited by examiner

*Primary Examiner* — Eduardo Colon Santana
*Assistant Examiner* — Iftekhar Mustafa
(74) *Attorney, Agent, or Firm* — Workman Nydegger

(57) ABSTRACT

Method of driving a single-coil motor having a stator and a rotor and a coil, comprising the steps of: monitoring a position signal and determining when said signal passes a first threshold; b) providing control signals for energizing the coil; c) a predefined period later, providing control signals for stopping or reducing the energization of the coil; d) monitoring a second signal indicative of the coil current, and determining a third time when said signal passes a second threshold level; and monitoring the first signal, and determining a fourth time when said signal passes a third threshold level; e) updating the prediction period; f) repeating steps b) to e). A driver circuit adapted for performing such method. A system comprising such driver circuit.

15 Claims, 10 Drawing Sheets

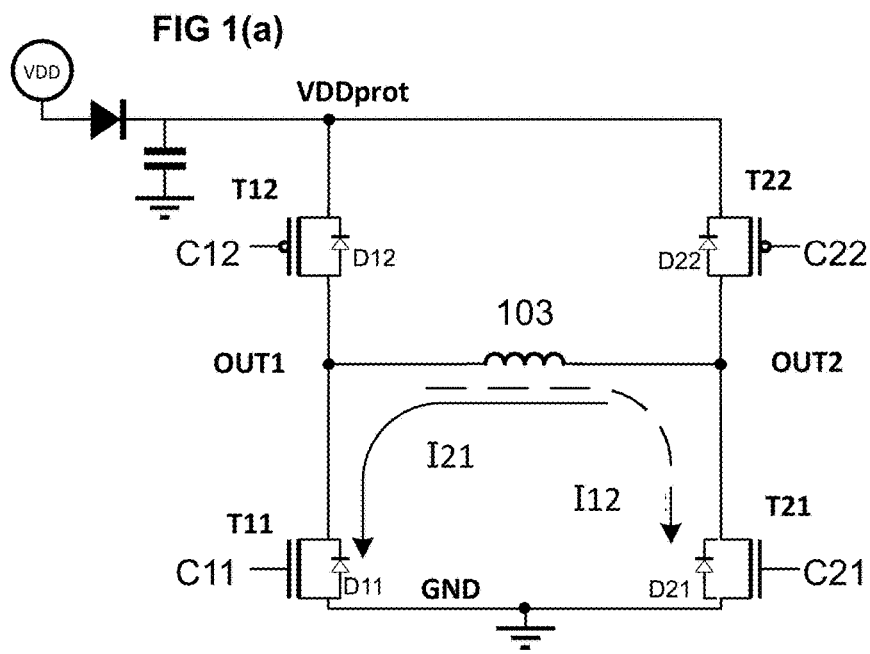
FIG 1(a)
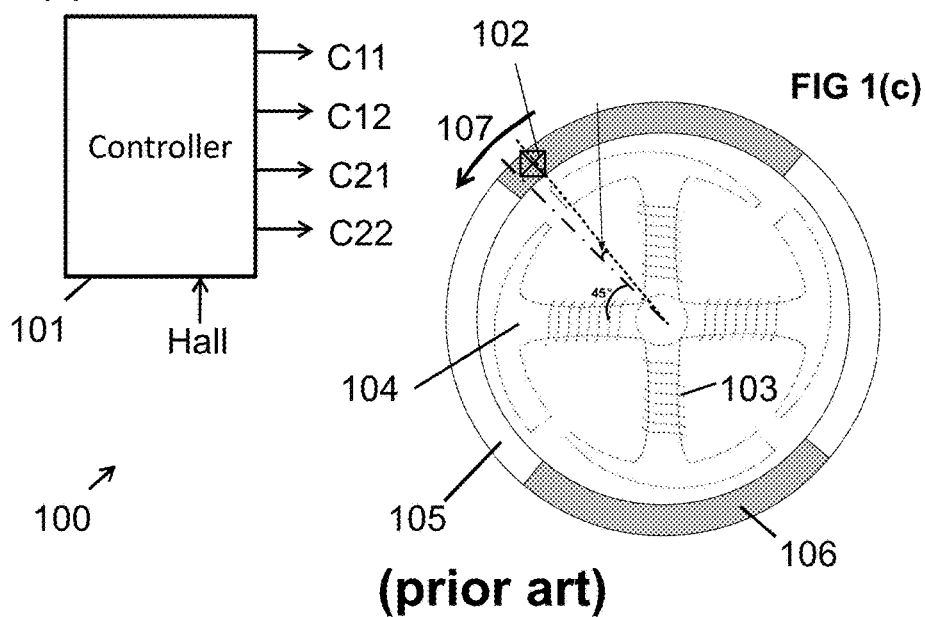
FIG 1(b)
FIG 1(c)
(prior art)

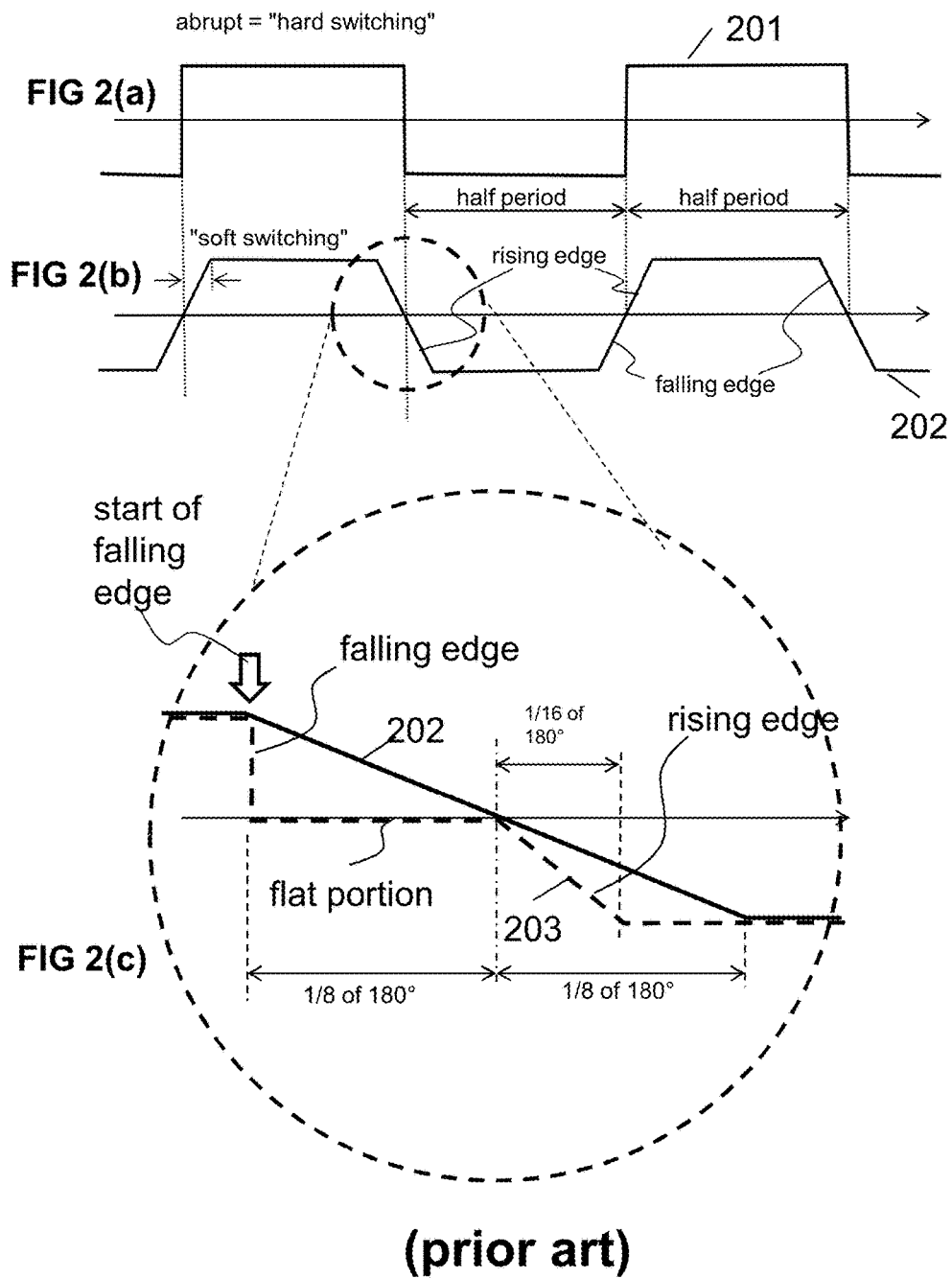
(prior art)

t1=t0+twait,
t2=t1+predic1,
t3=when current passes +/-threshold,
t4=when Hall changes signal=t0' e.g. ΔT=t4-t3

FIG 7(a)  Tpred[n+1] = Tpred[n] + (t4-t3) +ε
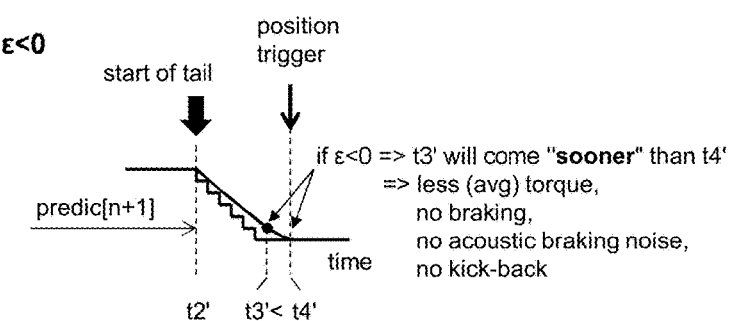
FIG 7(b)  ε<0
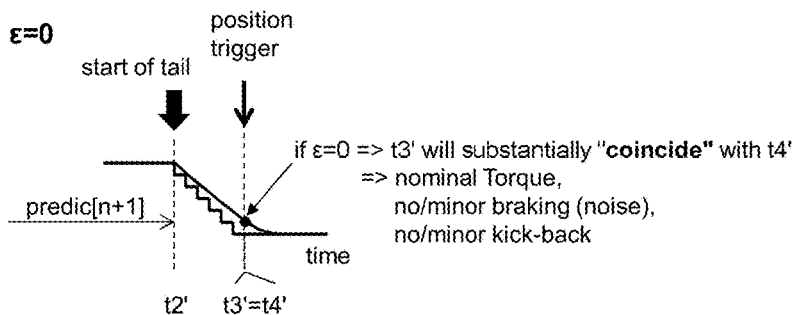
FIG. 7(c)  ε=0
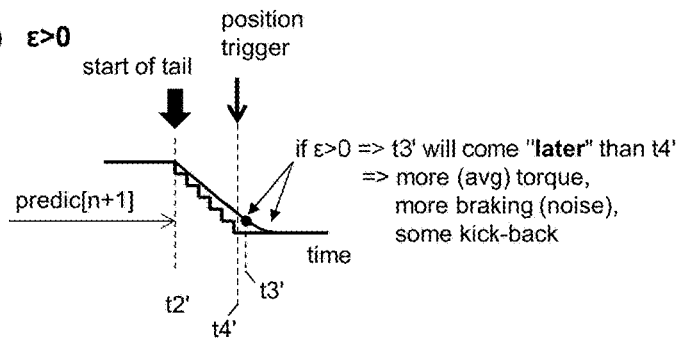
FIG 7(d)  ε>0

METHOD AND CIRCUIT FOR DRIVING SINGLE COIL BLDC MOTOR

FIELD OF THE INVENTION

The invention relates to the field of single coil brushless DC motors, and methods of driving single coil motors.

BACKGROUND OF THE INVENTION

The present invention relates to single phase brushless DC motors, i.e. a motor with a single coil. Single-phase motors are typically used in low cost motor applications, such as fan cooling applications.

Methods and circuits for driving single coil motors are known in the art, for example from US2011181214(A1) and U.S. Pat. No. 7,639,064(B2).

FIG. 1 shows a prior art system 100 comprising a single coil BLDC motor having a stator with a coil, and a rotor with permanent magnets (for example 2 north poles and two south poles), and a Hall sensor 102 for sensing whether a north pole or a south pole is passing the position of the Hall sensor. A controller 101, for example comprising an analog or a digital state machine, can read the Hall sensor signal and provide control signals C11, C12, C21 and C22 to drive the low-side transistors T11, T21 and the high-side transistors T12, T22 of the dual-H bridge (see FIG. 1a) in manners known per se in the art.

In some applications, e.g. fan cooling applications, the motor is designed to run always at maximum speed (when power is provided). Even though in these applications the speed is not configurable, the controller needs to make sure that the correct transistors are switched on and off, depending on the actual rotor position. The switching of the transistors is known as "commutation", which is a well known principle used to drive brushless motors.

FIG. 2(a) shows an exemplary (ideal) current waveform 201 with abrupt changes, obtainable by a so called "hard switching" technique. When using such a control scheme, the current in the coil changes very fast from a maximum positive value to a maximum negative value after each 180° of rotation (known as "half phase"), and remains constant between these "commutation points".

FIG. 2(b) shows another exemplary waveform 202 obtained by a so called "soft switching" technique, which can be achieved for example by driving the transistors in their linear region, or by driving at least some of the transistors with a PWM-signal. Many variations are possible. For example, the slope of the rising edge (typically after the moment commutation) and the slope of the falling edge (typically before the moment of commutation) need not be the same, and there may be a delay between the end of the falling edge and the start of the rising edge, etc. A portion of the waveform 202 of FIG. 2(b) is also shown in FIG. 2(c) in enlarged view.

FIG. 2(c) also shows a portion of a third exemplary waveform 203, where "the tail" of the waveform changes abruptly, then remains zero for ⅛ of 180°, and after the commutation point ramps-up linearly to reach its maximum amplitude at 1/16 of 180°. In all of these cases, the waveforms need to be synchronized to the actual rotor position in one way or another, which is a challenge to achieve, especially for low-cost fan drivers.

SUMMARY OF THE INVENTION

It is an object of the present invention to provide a method and a driver circuit for driving a single coil BLDC motor. In particular, it is an object of the present invention to provide a method and a driver circuit for driving a single coil BLDC motor with an improved commutation.

It is an object of particular embodiments of the present invention to provide a method and a driver circuit for driving a single coil BLDC motor that offers tuning capabilities of the commutation in favour of increased torque (accompanied with a slight increase of acoustic noise and kick-back voltage) or in favour of decreased acoustic noise and decreased kickback voltage (accompanied with a slight decrease of average torque).

These and other objectives are accomplished by a method and driver circuit according to embodiments of the present invention.

In a first aspect the present invention provides a method of driving a single-coil motor having a stator and a rotor and a coil, the method comprising the steps of: a) monitoring a first signal indicative of the rotor position relative to the stator position, and determining a start time when the first signal passes a first threshold level; b) at a first time defined as a predefined waiting period after the start time, providing control signals for energizing the coil for causing a current to flow in the coil; c) at a second defined as a predefined prediction period after the start time or as a predefined prediction period after the first time, providing control signals for stopping or reducing the energization of the coil for allowing the current flowing in the coil to decrease; d) monitoring a second signal indicative of the current flowing through the coil, and determining a third time when said second signal passes a second threshold level; and monitoring the first signal, and determining a fourth time when the first signal passes a third threshold level; e) updating the prediction period as a function of the third and fourth time to obtain an updated prediction period; f) repeating steps b) to e) at least once, using the fourth time instead of the start time; and using the updated prediction period instead of the predefined prediction period.

It is noted that "determining the start time" can for example be implemented as "setting or resetting or pre-setting a timer, or capturing a timer value, or capturing a counter value, or the like. From that moment on, the timer is assumed to be running.

It is noted that "determining a second, third or fourth time" can for example be implemented by capturing a timer value, or capturing a counter value, or the like.

It is noted that "energizing the coil" refers to applying a driving voltage to the coil, for example using a hard-switching profile (i.e. an abrupt transition), or a soft-switching profile (e.g. using a PWM-modulated signal) to gradually or stepwise increase or ramp-up the current.

It is noted that "stopping the energization of the coil" refers to abruptly reducing the supply voltage (hard-switching), and that "reducing the energization of the coil" refers to gradually or stepwise decrease or ramp-down the current.

It is noted that "updating the prediction period as a function of the third and fourth time" can mean for example: incrementing the prediction period by one if (t4−t3) is positive and decrementing the prediction period by one if (t4−t3) is negative, or can mean for example calculating the prediction period as a function of t4[n], t3[n] and Tpred[n] of the previous half period, or can mean for example calculating the prediction period as a function of one or more t4-values and one or more t3-values and one or more Tpred-values of more than one half-period.

Stated in simple terms, the method states that the moment t2 at which the energization of the coil stops or starts to ramp-down (the "end" of the energization pulse), is predicted in a closed loop, and is based on two signals: a signal related to the current, and a signal related to the position of the rotor. In some prior art solutions, this moment is determined based on angular position and angular speed (or the time required to rotate 180° or 360°, which is related to speed), but does not take into account the actual current flowing through the coil, which may deviate from the anticipated current, for whatever reason, for example due to tolerances on the exact position of the position sensor (which could be measured in an end-of-line test), but also due to unpredictable or dynamic factors such as temperature, aging, wear, voltage variations, etc.

It is an advantage of this method that it allows to predict in an adaptive way the moment in time at which the "tail" of the energizing profile should start, such that the decreasing current flowing in the coil will be "near-zero" shortly before, shortly after, or at the theoretical ideal moment of commutation, depending on which criterium is considered optimal for a given application.

It is an advantage of measuring a moment when the signal indicative of the coil current passes a predefined threshold, which can be chosen small, e.g. about 10% or about 20% of the maximum current amplitude, rather than trying to measure when said signal is almost zero, which is much more difficult and much more inaccurate.

The skilled person will recognize that a feedback-loop is proposed, where the actual time required for the current to drop to "near-zero" is determined (e.g. measured), and is used to predict when the tail should start.

Many prior art solutions only use Hall sensor information to determine a time-window in which the end of the tail should start to decrease (abrupt or gradually). These systems are open-loop systems, where the Hall sensor signal indicates when the commutation will take place, irrespective of the actual current through the coil.

It is noted that the "waiting period" can be zero, or can be different from zero (e.g. a predefined number of PWM cycles, e.g. less than 10).

It is noted that the step of monitoring the current for determining time t3, and monitoring the position signal for determining time t4 should occur in parallel, as t3 may occur before t4, or vice versa, or they may coincide.

"Energizing the coil" can mean:
applying a voltage signal without using PWM modulation within each half phase to abruptly increase the current in the coil, or can mean applying a voltage signal by using PWM modulation to gradually (e.g. linearly or otherwise smoothly) or stepwise increase the current in the coil (e.g. according to a predefined waveform profile, e.g. a substantially linear profile), which techniques are known per se as "soft-switching" or as "micro-stepping".

With "stopping the energization of the coil" is meant abruptly no longer applying a supply voltage to the coil.

With "reducing the energization of the coil" is meant gradually or stepwise decreasing the current in the coil, for example according to a predefined waveform.

"Monitoring a signal indicative of the rotor position" can mean for example monitoring a Hall sensor signal, or monitoring a back EMF signal, but other signals directly or indirectly indicative of the rotor position can also be used.

"Monitoring a signal indicative of the current flowing through the coil" can comprise for example measuring the current in an (almost) direct way by measuring a voltage over a shunt-resistor (in series with the coil) using an ADC, or can be measured in an indirect way, e.g. by measuring the voltage drop over a driving transistor. The current can also be measured or derived from the current in the transistor(s) connected to the supply (high side transistor(s) or in the transistor(s) connected to the ground (low side transistors), it can be measured "up" (higher than Vdd) or it can be measured "down" (lower than Gnd). Or the current in the coil can be measured by using comparators, for example when the current is flowing in overshoot, in the substrate diodes of the supply transistors, or by measuring the voltage over the RDS-resistor of a transistor using an ADC, but other signals directly or indirectly indicative of the current flowing through the coil can also be used. It is possible for example to use "sense FETs" to measure this current, or the current can be guided through a shunt resistor for causing a voltage which is measured by an ADC.

The time can be measured for example by means of a timer or a counter. The timer may be programmable and may be preloaded, or can be a freely running timer, the value of which is captured and stored in one or more registers. The timer can be a capture-timer or a compare-timer. The compare-timer can compare the counter value with a register value. With the register values, the algorithm can also be influenced.

In an embodiment, at least one of the first, second, third and fourth threshold value is different from zero.

In an embodiment, each of the first, second, third and fourth threshold value are different from zero.

For example, the second and fourth threshold value can be chosen to detect when the amplitude of the current in the coil is equal to a value in the range from 1 mA to 40 mA, for example is about equal to 5 mA or 10 mA.

In an embodiment, step c) comprises providing control signals for decreasing the current according to a predefined function selected from the group consisting of: an abrupt function, a linear function, a quadratic function, a third-order polynomial function, a piecewise-linear function, and a sinusoidal function.

With "abrupt function" is meant "discontinuous function", meaning that the value of the function virtually immediately jumps from one value to another.

In an embodiment, updating the predicted period comprises: increasing the predicted period with the difference between the fourth time and the third time and optionally adding a shift term.

In an embodiment, updating the predicted period comprises: increasing the predicted period with a linear combination of a limited set of differences between a fourth time and a corresponding third time measured in earlier half periods, and adding a shift term.

In this way, the tail is started at "the right (predicted) moment" such that the current in the coil will drop to zero or "near-zero" at the same moment as the position signal indicates that a commutation should take place.

In practice, it is possible and sometimes desirable to deliberately deviate from this "ideal moment". For example, if some extra torque is desired, the tail of the energization can deliberately be started somewhat later than the ideal moment, with the disadvantage of causing more acoustic noise and creating some kick-back voltage. For example, if low acoustical noise is desired, the tail of the energization can deliberately be started somewhat sooner than the "theoretical ideal moment", with the disadvantage of providing less torque. But in order to do so, the ideal moment at which the switch-off or ramp-down should start, needs to be precisely known.

The limited set may contain for example two or three or four sets of values.

In an embodiment, the shift term is a predefined value chosen such that the second signal indicative of the current flowing through the coil will pass said second threshold value at substantially the same moment as the first signal will pass the first threshold level.

With "at substantially the same moment as" is meant for example within a tolerance margin of less than 5° phase shift, preferably less than 3° phase shift. This is the so called "theoretical ideal moment" of commutation.

This offset can be used for example to correct for the error in the Hall position versus the BEMF position. In case of using a Hall sensor as position sensor, the predefined value of the shift term can be chosen such that the Hall sensor signal becomes more representative for the ideal commutation point.

In an embodiment, the shift term is a predefined value chosen such that the second signal indicative of the current flowing through the coil will pass said second threshold value at said third moment in time located before the fourth moment at which the first signal will pass the third threshold level.

It is an advantage that this reduces kick-back voltage, or the risk that kick-back voltage occurs. However, the predefined value should not be too high, because this also reduces the average torque, and thus speed.

In an embodiment, the shift term is a predefined value chosen such that the second signal indicative of the current flowing through the coil will pass said second threshold value at said third moment in time located after the fourth moment at which the first signal will pass the third threshold level.

It is an advantage that this increases average torque. Unfortunately this also slightly increases the risk of kick-back and acoustic noise.

In an embodiment, the shift term is a predefined value.

The predefined shift term may be a fixed term, which may be hardcoded, or may be programmed as a fixed constant, or may be read from a non-volatile memory for example. This value could be determined at the design-stage, or could be programmed in said non-volatile memory during manufacturing, e.g. in a calibration test, or in an End-of-Line (EOL) test.

In an embodiment, the method further comprises determining a motor state time; and wherein the shift term is a predefined value dependent on the motor state time.

The shift value can for example be determined by means of a look-up table, or can be calculated mathematically as a function of the motor state time.

In an embodiment, monitoring a first signal indicative of the rotor position comprises monitoring a Hall sensor signal.

In the specific case where the second signal is a Hall sensor signal and the first threshold level is zero, "monitoring the second signal" means "monitoring a zero crossing of the Hall sensor signal", but the invention is not limiting to only this implementation, and other position sensor signals (e.g. optical position sensor signals), and/or other signal levels (e.g. a voltage different from zero), will also work.

In an embodiment, the first signal is a delayed version of the output of a Hall sensor.

The delay may be set to a predefined value different from zero, or the delay may be dynamically configurable. This offers the advantage that the moment in time at which the delayed signal changes sign can easily be shifted forward or backwards in time, which is not possible with prior art solutions, which can only be shifted forward in time.

In an embodiment, monitoring a first signal (Sp) indicative of the rotor position comprises monitoring a signal that is indicative of the back EMF signal.

The BEMF signal can be used as an indication of the rotor position. In particular embodiments, wherein moreover the first threshold signal is zero volt, this method monitors zero-crossings of the BEMF voltage as an indication of the rotor position.

It is noted that monitoring BEMF signal per se is well known in the art, but not in combination with current sensing and with timing information in a closed loop for predicting the moment when the tail of the energizing waveform should stop or should start to decrease such that the current will be substantially zero (or slightly above zero, or slightly below zero) at the moment when the current through the coil should change direction (the ideal moment of commutation).

In a second aspect, the present invention provides a method of driving a single coil fan using the method according to the first aspect.

The method described above is especially suited for driving single-coil fan motors.

In a third aspect, the present invention also provides a drive circuit for driving a system comprising a single-coil motor having a stator and a rotor and a coil, the drive circuit comprising: a timer or a counter; first monitoring means configured for monitoring if a first signal indicative of a rotor position is larger than or passes a first threshold level; second monitoring means configured for monitoring if a second signal indicative of a current flowing through the coil is larger than or passes a second threshold level; a memory or registers; a controller comprising or connectable to said memory, and to said timer or counter, and to said first monitoring means, and to said second monitoring means, and being adapted for performing the method according to the first or second aspect.

The drive circuit may be an integrated semiconductor chip.

In a fourth aspect, the present invention also provides a system comprising: a single phase BLDC motor comprising said single coil; a drive circuit according to the third aspect; a position sensor as part of the drive circuit or an external position sensor, configured for providing the first signal indicative of the rotor position; a current sensor as part of the drive circuit or an external current sensor, configured for providing the second signal indicative of the current flowing through the coil.

The drive circuit may further comprise or be connected to a driver stage.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 1 shows a prior art system comprising a single coil BLDC motor and driver circuit.

FIG. 1(a) shows the coil of the motor and a drive stage in the form of dual-H bridges.

FIG. 1(b) shows a block-diagram of a driver circuit.

FIG. 1(c) shows an example of a single coil BLDC motor, comprising a stator and a rotor and a Hall element, and a coil wound around the stator shoes.

FIG. 2(a) and FIG. 2(b) show two exemplary current waveforms, illustrating two examples of how commutation can be performed.

FIG. 2(a) shows an exemplary waveform with abrupt switching, also known as "hard switching".

FIG. 2(b) shows an exemplary waveform with smooth (e.g. linear) switching, as an example of a "soft switching" technique. A portion of the waveform of FIG. 2(b) is also shown in enlarged view in FIG. 2(c).

FIG. 2(c) further shows a third exemplary waveform, having a falling edge that changes abruptly, then the waveform remains zero for ⅛th of a half-period, and ramps-up linearly at the commutation point to reach its maximum amplitude at 1/16th of the half-period.

FIG. 6 shows exemplary waveforms to illustrate an underlying principle of the present invention.

FIG. 7(a) shows a possible formula which can be used to update the prediction, as an embodiment of the present invention. A value "ε" can be chosen to deliberately move the "tail" of the energization waveform forward or back in time relative to the "ideal moment" of commutation.

FIGS. 7(b), 7(c), and 7(d) show an example for ε<0, ε=0 and ε>0 respectively.

DETAILED DESCRIPTION OF ILLUSTRATIVE EMBODIMENTS

Figure 3:
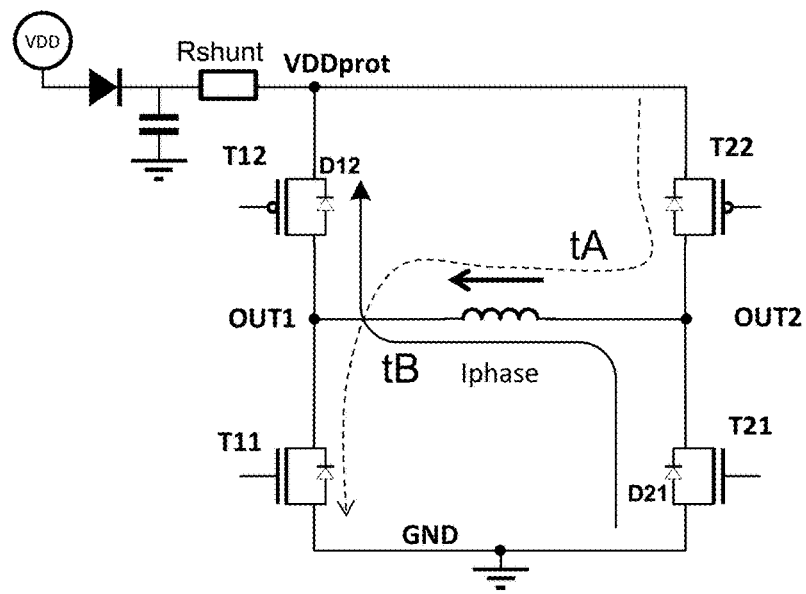
FIG. 3 shows an exemplary path that the current will follow when the current in the coil was flowing from node OUT2 to node OUT1 before the commutation, when subsequently all transistors are switched off, resulting in a so-called "kick-back voltage", a phenomenon known per se in the art.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, the terms "coil" and "inductor" and "winding" are used as synonyms.

In this document, the term "rising edge" is used to indicate a portion of the waveform with an increasing amplitude (in absolute value). In the context of the present invention, the "rising edge" typically means a portion of the waveform starting from about zero amplitude and ending at about maximum amplitude, the start of the rising edge usually being located at or shortly after the ideal commutation point.

In this document, the term "falling edge" is used to indicate a portion of the waveform with a decreasing amplitude (in absolute value). In the context of the present invention, the "falling edge" typically means a portion of the waveform starting from about maximum amplitude and ending at about zero amplitude, the end of the falling edge usually being located at or shortly before the ideal commutation point.

The present invention relates to methods and driver circuits for driving a single coil BLDC motor, as may be used for example in fan cooling applications.

FIG. 1 shows a prior art system comprising a single coil BLDC motor and a driver circuit 101.

FIG. 1(a) shows an electric block diagram comprising the coil 103 of the motor and a drive stage comprising four transistors T11, T21, T12, T22 configured in the form of a dual-H bridge. The transistors T11, T21 are sometimes referred to as the "low-side transistors". The transistors T12, T22 are sometimes referred to as the "high-side transistors".

As is well known in the art, in order to let the current I21 flow through the coil 103 in the direction from node OUT2 to node OUT1, the transistors T12 and T21 are typically switched OFF (switch open), and the transistors T11, T22 are typically switched ON (switch closed). In order to let the current I12 flow through the coil in the opposite direction (from node OUT1 to node OUT2), the transistors T12 and T21 are typically switched ON (switch closed) while the transistors T11 and T22 are typically switched OFF (switch open).

FIG. 1(b) shows a block-diagram of a prior art driver circuit 101, receiving a signal from the Hall sensor 102 (see FIG. 1c) and adapted for providing control signals C11, C12, C21, C22 for each of the transistors T11, T12, T21, T22 respectively. For completeness it is noted that other schemes are possible, for example the low side transistors may be continuously switched ON, in which case only the high side transistors are used to control flow of the current through the coil, as is known in the art.

FIG. 1(c) shows an example of a single coil BLDC motor, comprising a stator with four stator shoes 104 (which may be asymmetrical), and a rotor with four magnet poles. The motor of FIG. 1(c) further comprises a Hall element 102 which is used as a position sensor, e.g. to indicate whether a North Pole or South Pole is facing the Hall element. A single coil 103 is wound around the stator shoes. The arrows 107 show the direction of rotation of the motor.

FIG. 2(a) shows an exemplary current waveform (of the current flowing through the coil) resulting from such an abrupt switching scheme, known as "hard switching".

Instead of using the transistors as mere switches which are kept open or closed between the commutation points, it is also possible to use the transistors in their so-called "linear region", or to drive at least one of the transistors with a PWM-modulated signal, resulting in smooth switching of the transistors.

FIG. 2(b) shows an exemplary waveform resulting from such smooth switching. A portion of the waveform of FIG. 2(b) is also shown in enlarged view in FIG. 2(c).

FIG. 2(c) further shows a third exemplary waveform 203, having a falling edge portion that changes abruptly, followed by a substantially "flat portion" where the amplitude of the waveform remains about zero for ⅛th of a half-period, and a rising edge portion where the waveform 203 ramps-up linearly, starting from the commutation point, the rising portion having a slope so as to reach the maximum amplitude at about 1/16th of the half-period. These and other waveforms and commutation schemes are known in the art, for example from EP3059852(A1).

As can be appreciated from FIG. 2(a) and FIG. 2(b), and as is known in the prior art, the start of the rising edge of the waveform is typically initiated at or shortly after the moment when the signal from the Hall position sensor (see FIG. 1(c)) changes sign. Indeed, the Hall signal not only indicates in which direction the current needs to flow, but also indicates at which moment the commutation should (ideally) take place.

When "hard switching" is used, the moment at which the Hall sensor signal changes sign is also the moment at which the "falling edge" should occur. In prior art also more advanced switching methods are known in which the start of the falling edge 10 is started at a predefined time or angle before the hall sensor changes sign, for instance using an AGC. In these more advanced methods the start of the falling edge 10 can be abrupt, as shown in FIG. 2(c), and is then followed by a so called "flat portion", before the coil is energized in the opposite direction. Alternatively the falling edge 10 can also be decreases in a controlled manner, for example according to a predefined waveform, e.g. according to a substantially linearly decreasing function, or according to a substantially quadratically decreasing function, or according to at least a third order polynomial, or according to a logarithmic function, or according to a sinusoidal waveform.

Even though the energization of the coil (e.g. the voltages applied to the coil) can be changed abruptly, the current in the coil cannot instantly change from −MAX to +MAX, but needs a certain amount of time due to the inductance of the coil. It shall also be clear that if this starting moment of the falling edge is chosen too soon, that the current will be zero before the commutation should takes place, resulting in lower motor torque; and that in case the starting moment of the falling edge is chosen too late, that the current will not be zero in time, resulting in a so called kick-back voltage, an example of which is illustrated in FIG. 3 and FIG. 4.

Figure 4:
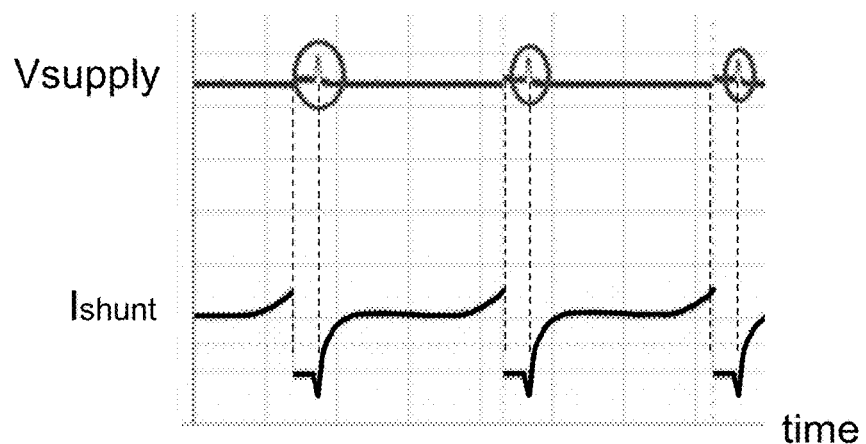
FIG. 4 shows an example of a current waveform and a supply voltage waveform resulting from a "hard switching" commutation scheme.

FIG. 3 illustrates what happens when, at a given moment in time to the current (shown in dotted line) is flowing (e.g. at maximum amplitude) through the coil from node OUT2 to node OUT1, (T22 and T11 being closed or PWM-driven, T12 and T21 being open), when suddenly at time tB all switches are opened. Since the current cannot stop instantly, the current continues to flow through the coil in the same direction (although its amplitude will decrease), but via another path, namely via the two diodes D21 and D12 (e.g. body diodes of the transistors), causing the voltage of node OUT2 to become about −0.7V and causing the voltage of node OUT1 to become about VDD+0.7V. This typically causes a so called "kick-back" voltage, as shown for example in FIG. 4 (top). Also shown in FIG. 4 is the current flowing through the shunt resistor Rshunt shown in FIG. 3.

Another problem in case of kick-back voltage is that, while the current is decreasing in amplitude, it is generating a magnetic field in the wrong direction, causing a breaking force on the rotor and increasing acoustical noise, both of which are undesirable.

This problem (of the current through the coil becoming zero "too soon" or "too late") is sometimes addressed in the prior art by not locating the falling edge on the commutation point, but locating it a sufficiently large time "before" the commutation point, as illustrated for example by the falling edge of dashed waveform 203 in FIG. 2(c).

While this solution solves the problem of kick-back voltage and active breaking torque and acoustical noise, it has the disadvantage of unnecessarily reducing the torque if the start occurs too soon. In prior art single-coil motor drivers, there is no mechanism to find the "optimum starting point" of the falling edge, but instead a safe starting point is used, for example ⅛th of 180°=about 22.5° before the actual commutation, irrespective of the actual motor speed, the actual load, environmental parameters (temperature, humidity), wear, etc.

The present invention proposes a solution that allows to "fine-tune the falling edge of the current waveform".

More in particular, the present invention proposes a solution to choose "an optimum" starting point for a particular application, based on a predefined criterium, and during operation, dynamically fine-tunes the starting point to satisfy this criterium. The proposed solution works best when the motor is running substantially at constant speed and constant load, irrespective of which monotonically decreasing shape of the falling edge is chosen, for example: linearly decreasing amplitude, or sinusoidally decreasing amplitude, staircase, or abrupt, and even if the actual load or actual inductance is different from the nominal values assumed during design of the motor.

Three particular cases are envisioned:
(i) the case where the decreasing current amplitude reaches zero at about the same time as a signal indicative of the rotor position changes sign, e.g. when the Hall sensor signal change polarity. This moment in time is generally referred to as the "ideal commutation moment". This "working point" (in theory) offers a relatively high torque, no breaking force, and no associated acoustical breaking noise.
(ii) the case where the decreasing current amplitude reaches zero slightly before said the "ideal commutation moment" described under (i). The amount of time may be expressed as a fixed angular distance (e.g. "5°"), or as a fixed absolute time period (e.g. "100 µs" or "200 µs"). Such a "working point" offers a slightly lower (average) torque, but offers a reduced risk of generating breaking force and associated acoustical noise.
(iii) the case where the decreasing current amplitude reaches zero slightly after said "ideal commutation moment". Again, the amount of time may be expressed as a fixed angular distance or a fixed relative time or a fixed absolute time period. Such a "working point" offers a slightly higher (average) torque, but will also cause some breaking force and generate associated acoustical noise.

In the example described further, a fixed absolute time period will be denoted by letter "249 ", which is regarded as a deliberate shift with respect to the "ideal commutation moment".

Figure 5:
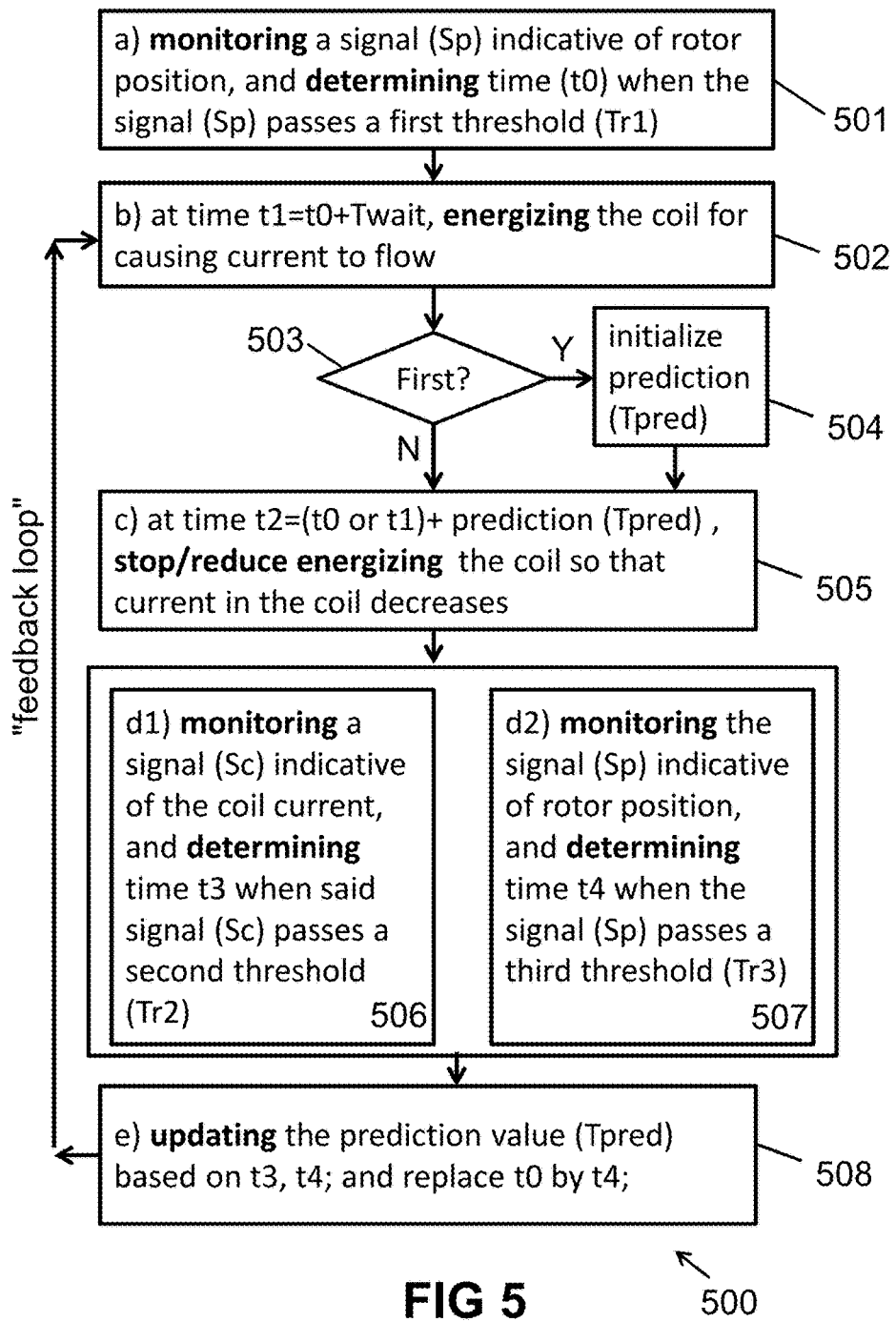
FIG. 5 is a flowchart to illustrate a method according to an embodiment of the present invention.

FIG. 5 is a flowchart to illustrate a method 500 of driving a single-coil motor having a stator and a rotor. More in particular, the method allows to more accurately and dynamically determine "the optimum" moment in time at which the falling edge (with a predefined profile or slope or shape) has to start, the optimum being set or pre-selected as (i) the theoretical ideal moment, (ii) slightly earlier than the ideal moment, e.g. for applications where "lower noise" is more important than "higher torque", or (iii) slightly later than the ideal moment, e.g. for applications where "higher torque" is more important than "lower noise".

FIG. 5 shows a method 500 of driving a single-coil motor having a stator and a rotor and a coil. This particular algorithm would typically be executed after the motor was started up in any known manner, and the motor state time has dropped below a predefined value, for example has dropped below 50 ms or below 40 ms. The method 500 comprises the steps of:
a) monitoring 501 a first signal "Sp" (see FIG. 8), e.g. a Hall sensor signal, or a delayed Hall sensor signal, the first signal being indicative of the rotor position relative to the stator position, and determining e.g. capturing a start time t0 when the first signal Sp passes a first threshold level Tr1;

In the exemplary waveforms of FIG. 6, this step is performed before and at time t0.
b) at a first time t1, defined as a predefined waiting period "Tw" after the start time t0, providing 502 control signals for energizing the coil, by providing suitable signals to the transistors T11, T12, T21 and T22, for causing a current to flow in the coil.

The waiting period "Tw" may be zero, or may be a predefined absolute period (e.g. a value in the range from 10 µs to 200 µs).

The time t1 can for example be expressed mathematically as: t1=t0+tw.

The control signals may be adapted for energizing the coil according to a predefined current profile, e.g. a linear ramp-up with a predefined slope, or a quadratic ramp-up, or a ramp-up according to a sinusoidal function, or according to a polynomial function having at least a third order, or any other suitable predefined shape.

In the exemplary waveforms of FIG. 6, this step 502 is performed at time t1.

If step 502 was executed for the first time (after each power on), then a prediction time "Tpred" is initialized to a predetermined value in step 504. The predetermined value may be hardcoded, or may be retrieved from a non-volatile memory (e.g. EEPROM or FLASH) for example.
c) at a second t2 defined as said predefined prediction period "Tpred" (or in a subsequent iteration as an updated prediction period) later than the start time "t0" (meaning: t2=t0+Tpred), or later than the first time "t1" (meaning: t2=t1+Tpred), providing control signals C11, C12, C21, C22 (see FIG. 8) for stopping or reducing the energization of the coil for allowing the current flowing in the coil to start to decrease.

Or stated in other words, the time "t2" is the moment at which the falling edge of the waveform starts. The falling edge may be abrupt, or may be a staircase (as shown in the example of FIG. 6), or may be a linear slope towards zero, or any other suitable shape. According to an underlying principle of the present invention, this time "t2" is predicted such that the current in the coil is near-zero, at, slightly before, or slightly after the theoretical ideal moment of commutation, depending on which of the criteria (i), (ii) or (iii) is used.

Whereas in the prior art the time "t2" (or the parameters how this time is to be determined) is fixed during the design stage and/or during an End-Of-Line Calibration during the production stage, this time "t2" is close to, but never corresponds to reality, and cannot fully take into account the effects of actual wear, actual load, actual tolerances, actual influences of temperature, etc, at best only estimated values, but the method according to the present invention does.

In the exemplary waveforms of FIG. 6, step 505 relates to time "t2". In the example of FIG. 6, the value is determined as t2=t1+Tpred, but it can of course also be calculated as t2=t0+Tpred.

d1) monitoring 506 a second signal "Sc" indicative of the current flowing through the coil, and determining a third time "t3" when said second signal "Sc" passes a second threshold level Tr2;

d2) monitoring 507 the first signal "Sp", and determining a fourth time "t4" when the first signal passes a third threshold level "Tr3".

The first threshold level Tr1 and the third threshold level Tr3 may both be zero, or the first threshold Tr1 may for example be a small positive voltage level, and the third threshold Tr3 may for example be a small negative voltage level, preferably of the same amplitude. In some embodiments, the values of Tr1 and Tr3 may be fixed.

Likewise the values of Tr2 and Tr4 preferably have the same absolute value, and have the same sign or opposite sign (depending on how the signal indicative of the coil current is measured), but they could also have different amplitude, or may both be equal to zero.

The steps 506, 507 are preferably performed in parallel, or interleaved, because the time t3 can occur before time t4, or vice versa. The third threshold Tr3 may be the same value as Tr1 (e.g. zero), or may have the same amplitude as Tr1 but with opposite sign, or may have a value different from Tr1.

In the exemplary waveforms of FIG. 6, these steps relate to time "t3" and time "t4".

e) updating 508 the prediction period "Tpred" as a function of at least the third and fourth time t3, t4 to obtain an updated prediction period "Tpred".

The idea behind these steps is that the actual time is determined, for example measured, at which the actual current flowing through the coil actually reaches a predefined threshold Tr2, for example a threshold value close to zero (e.g. a value in the range from 1 mA to 50 mA, for example equal to 40 mA or 30 mA or 20 mA or 10 mA or 5 mA or 3 mA or 1 mA), but not exactly zero, because it is difficult or even impossible to measure exactly when an exponentially decaying function reaches zero. Instead of actually measuring the coil current itself, a sensor signal "Sc" related to the current can be measured instead, for example a voltage over a resistor connected in series with the coil, directly or indirectly, see for example FIG. 12, for example by making use of a "senseFET".

In a simple implementation, the updated value for the prediction period "Tpred[n+1]" can simply be calculated as the previous value Tpred[n] plus a time difference $\Delta T = t4 - t3$, corresponding to the time difference between the actual time t3 at which the current signal Sc passed its threshold Tr3, and the actual time t4 at which the position signal Sp passed its threshold Tr4, of the previous half period, or of the previous period, or as a linear combination (e.g. average or weighted average) of a limited set of such $\Delta T$ values of preceding half periods. Optionally a digital filter is applied to these values, for example a so called FIR-filter, or an IIR-filter. In some embodiments the prediction period Tpred[n+1] is only incremented by "+1" or decremented by "−1" in each half period, depending on whether $\Delta T$ is positive or negative.

In a somewhat more sophisticated implementation, the updated value for the prediction period "Tpred[n+1]" can be further adjusted by also taking into account the predefined value "ε" mentioned above, for applications where torque is more important than noise, or vice versa.

In some embodiments the prediction period Tpred[n+1] is adapted based on current thresholds. If the current at the predicted commutation point t4, (or alternatively at any other point in time between t2 and t4) is larger than a first (large) threshold then the prediction time is increased by +4 PWM periods, and if the current is larger than a second (small) threshold, but smaller than the first large threshold, the prediction time is increased by only +1 PWm period, and if the current is smaller than a second (small) threshold, the prediction time is reduced by −1 PWM period.

Of course, it is also possible to slightly compensate also for the value of the threshold Tr2 not being exactly equal to zero, for example by a linear extrapolation of the time from the point (t2, MAX_amplitude) to the point (t3, Tr2).

f) The steps (b) to (e) are then repeated at least once, but using the fourth time "t4" as the new start time "t0"; and using the updated prediction period "Tpred", as indicated by the arrow "feedback loop" in FIG. 5.

Thus the position of the time "t2" at which the falling edge must start, is dynamically adjusted based on an signal indicative of the actual position (e.g. the zero-crossing of a Hall sensor signal), and based on a signal indicative of the actual coil current, e.g. a signal of a current flowing through one of the transistors, or a current flowing through a shunt resistor (as shown for example in FIG. 12), or a voltage over said shunt resistor, or a current flowing through one of the bypass-diodes, or any other signal indicative of the actual coil current.

As already discussed in relation to FIG. 5, FIG. 6 shows exemplary waveforms to illustrate an underlying principle of the present invention.

Figure 6A:
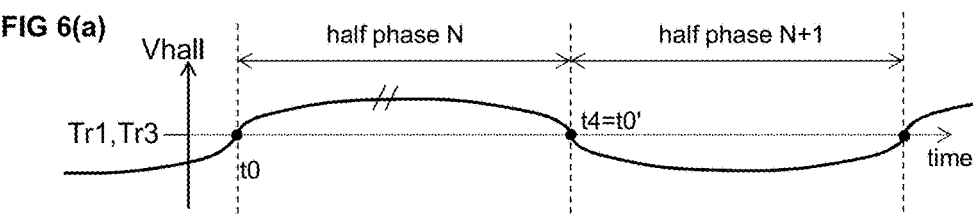
FIG. 6(a) shows a Hall signal (as an example of a signal indicative of the rotor position) as a function of time for a running motor, and instances in time when said signal passes a first and third threshold (in this example both being equal to zero).

FIG. 6(a) shows a Hall signal Vhall, as an example of a signal "Sp" indicative of the rotor position, as a function of time for a running motor. Instances in time t0, t4 when said signal passes a first Tr1 and third threshold Tr3 level are also indicated. In the example of FIG. 6(a) both thresholds Tr1 and Tr3 are equal to zero, but the invention is not limited thereto, and values different from zero, can also be chosen, as explained above.

Figure 6B:
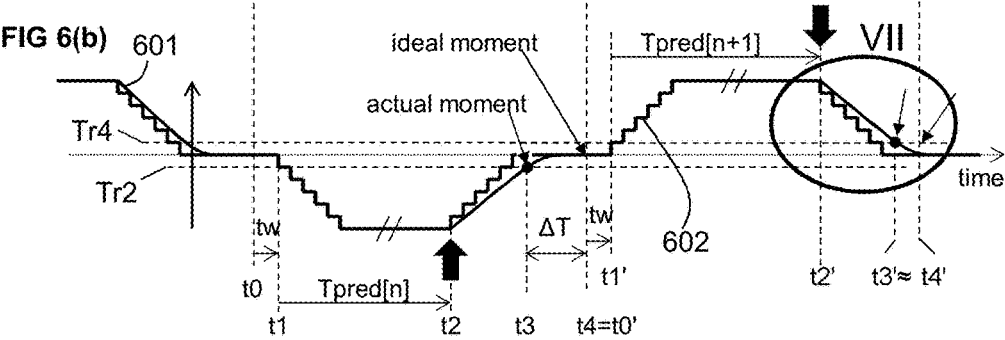
FIG. 6(b) shows a signal indicative of the current flowing through the coil, and instances in time when said signal passes a second threshold, and a predicted moment in time when the energization needs to stop or decrease, chosen such that the current amplitude has decreased to a certain range when the next commutation needs to occur.

FIG. 6(b) shows a signal "Sc" indicative of the current flowing through the coil, and instances in time t3 when said signal passes a second threshold Tr2, and a predicted moment in time "t2" when the energization needs to stop (e.g. in case of an abrupt falling edge) or needs to start decreasing (e.g. in case of a linear ramp-down, or other monotonous function, e.g. quadratic or sinusoidal, etc.). An important aspect of the present invention is that the value of "t2" is dynamically determined (by the method illustrated in FIG. 5) in such a way that the amplitude of the signal "Sc" has decreased to a near-zero value shortly before (ii), shortly after (iii) or at the theoretical ideal moment of commutation.

For example, in case a voltage over a diode (e.g. body diode of the transistor) is used as the signal "Sc", a suitable range for the threshold level Tr2 could be for example the range from 0.4V to 1.0V, for example equal to 0.4V or 0.5V or 0.6V or 0.7V or 0.8V.

In FIG. 6, the notation Tpred[n] is used to indicate the value in a half period number "n", and the notation Tpred [n+1] is used to indicate the value in half period number "n+1", which is a common notation in the art of control loops.

FIG. 7 illustrates several examples of how the start "t2" of the falling edge (also referred to herein as "tail") can be chosen optimally for a given application, according to case (i), (ii) and (iii) described above.

FIG. 7(a) shows a possible formula which can be used to update the prediction Tpred for the next half period, based on a single preceding half period:

$$T\text{pred}[n+1]=T\text{pred}[n]+\Delta T[n]+\varepsilon \qquad [1], \text{ and}$$

$$\Delta T[n]=(t4[n]-t3[n]) \qquad [2],$$

wherein: Tpred[n] is the prediction value in half period with number "n",
  t4[n] is the moment at which the "position signal" Sp passed threshold Tr1 or Tr3 (e.g. depending on whether the signal is positive or negative) in half period with number "n",
  t3[n] is the moment at which the "current signal" Sc passed threshold Tr2 or Tr4 (e.g. depending on whether the signal is positive or negative) in half period with number "n",
  and $\varepsilon$ is a predefined constant absolute time, chosen for a specific application, depending on whether higher torque is more important than lower acoustical noise, as described above.

Of course, it is also possible to update the prediction Tpred for the next half period, based on information taken from two preceding half periods:

$$T\text{pred}[n+1]=T\text{pred}[n]+\Delta T[n]+\varepsilon \qquad [3]=[1], \text{ and}$$

$$\Delta T[n]=A*(t4[n-1]-t3[n-1])+B*(t4[n-2]-t3[n-2]) \qquad [4],$$

wherein A and B are "weighting factors", for example A=B=½, or A=¾ and B=¼, but the present invention is not limited thereto, and other values can also be used.

As explained above, the shift value "$\varepsilon$" can be chosen to deliberately move the "tail" of the energization waveform forward or backwards in time relative to the "theoretical ideal" moment of commutation. FIG. 7(b),(c),(d) shows an example for $\varepsilon<0$, $\varepsilon=0$ and $\varepsilon>0$ respectively. The shift value "$\varepsilon$" is a fixed predefined constant, and is not dependent on the motor speed.

It is pointed out that instead of choosing a particular shift value "$\varepsilon$" (e.g. at design-time or at during production, depending on the application), that it is also possible to choose particular threshold values, depending on the application.

In some embodiments the values of the thresholds and/or the shift value "$\varepsilon$" is selected only during actual use, for example shortly after start-up, for example depending on one or more fixed motor characteristics, such as coil resistance or magnet strength for a particular motor.

It is pointed out that, instead of updating the value of "Tpred" at once, it is also possible to update the value incrementally over multiple half periods. In this case, it would suffice to test whether t3>t4 or t3<t4, and depending on the outcome, to increment Tpred with a predefined value, or to decrement Tpred with a predefined value, rather than actually capturing the time t3 and t4 and calculating the difference $\Delta T$ between them.

Figure 8:
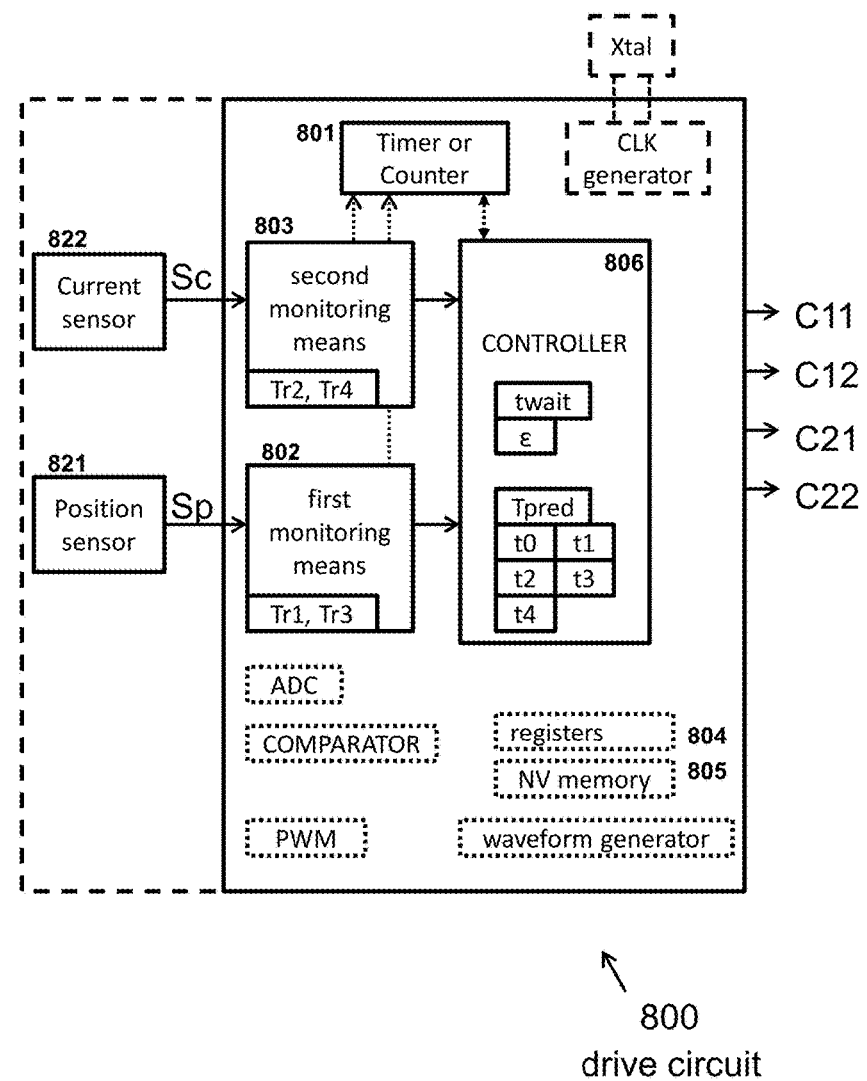
FIG. 8 shows a possible block diagram of a drive circuit according to embodiments of the present invention, that can be used to implement the method of FIG. 5.

FIG. 8 shows a possible block diagram of a drive circuit 800 for driving a system comprising a single-coil BLDC motor having a stator and a rotor and a coil, that can be used to implement the method of FIG. 5, and/or variants thereof.

The drive circuit 800 comprises:
  a timer 801 or a counter;
  first monitoring means 802 configured for monitoring if a first signal "Sp" indicative of a rotor position is larger than or passes a threshold level Tr1, Tr3;
  second monitoring means 803 configured for monitoring if a second signal "Sc" indicative of a current flowing through the coil is larger than or passes a threshold level Tr2, Tr4;
  at least one memory 804, 805, for example a volatile memory (e.g. RAM and/or registers) and/or a non-volatile memory (e.g. FLASH or EEPROM);
  a controller 806 connected or connectable to said at least one memory 804, and to said timer 801 or counter, and to said first monitoring means 802, and to said second monitoring means 803, and being adapted for performing the method of FIG. 5.

The drive circuit may be implemented as an integrated semiconductor device.

In FIG. 8 the timer is shown as part of the semiconductor device, but it is also possible to use an external timer.

The first monitoring means 802 may for example comprise an analog comparator for testing whether the signal "Sp" is larger or smaller than a certain threshold Tr1, Tr3, or may comprise an analog-to-digital convertor for digitizing said signal, which digitized signal can then be compared to a digital threshold value Tr1 or Tr3, for example by the controller 806.

Likewise, the second monitoring means 803 may for example comprise an analog comparator for testing whether the signal "Sc" is larger or smaller than a certain threshold Tr2, Tr4, or may comprise an analog-to-digital convertor for digitizing said signal.

The memory 804 can for example be used to store predefined constants, such as the waiting time "Tw" and the shift value "$\varepsilon$", and/or for storing local variables, such as Tpred, t0, t1, t2, t3, t4 for one or more periods or half periods, and for storing optional filter coefficients (in case of a FIR or IIR filter) and/or weighting coefficients.

The controller 806 may for example comprise a digital state machine, and/or may comprise an arithmetic unit.

Whether the functionality of capturing a timer or counter value, and/or storing said value in a register is implemented in the first/second monitoring means 802, 803 or in the controller 806, is an implementation issue, and not relevant for the present invention.

The drive circuit 800 may be implemented as a hybrid chip, and may further comprise for example a driver stage for energizing the coil of the BLDC motor. The driver stage may comprise or consist of an H bridge.

The position sensor 821 may comprise at least one Hall sensor. The position sensor may be part of the drive circuit, or may be a separate device located outside of the driver circuit 800. But other means for determining a rotor position can also be used, for example based on BEMF.

The current sensor 822 may comprise for example a shunt resistor and means for measuring a voltage over the shunt resistor, and/or means for measuring a voltage over a diode (e.g. the body diode of the transistor), and/or means for measuring a voltage over a transistor.

Figure 9:
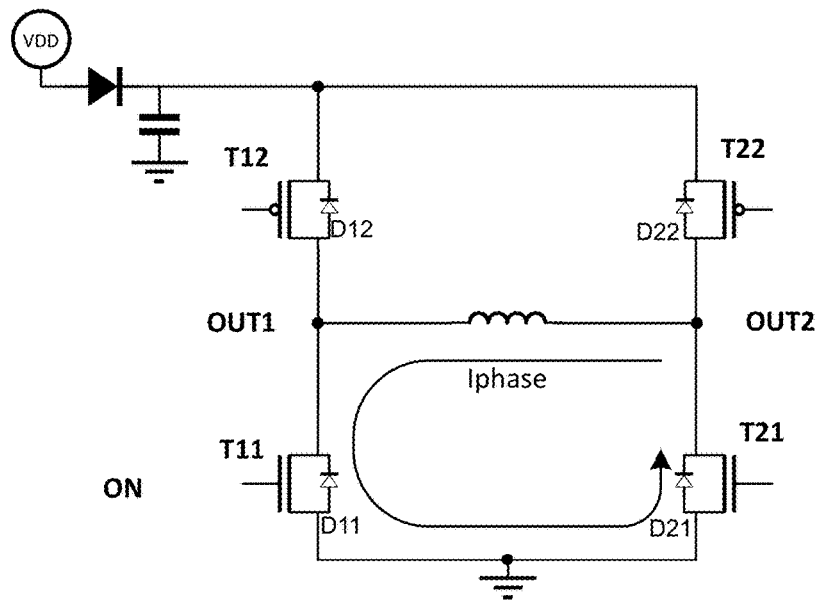
FIG. 9 shows an example wherein the current flowing through the coil can be measured by measuring the current flowing through T11 and/or by measuring a reverse voltage over T21.

FIG. 9 shows an example wherein the current flowing through the coil can be measured by measuring the current flowing through low side transistor T11 and/or by measuring a voltage over T21, and/or a forward voltage over D21, or combinations thereof.

Figure 10:
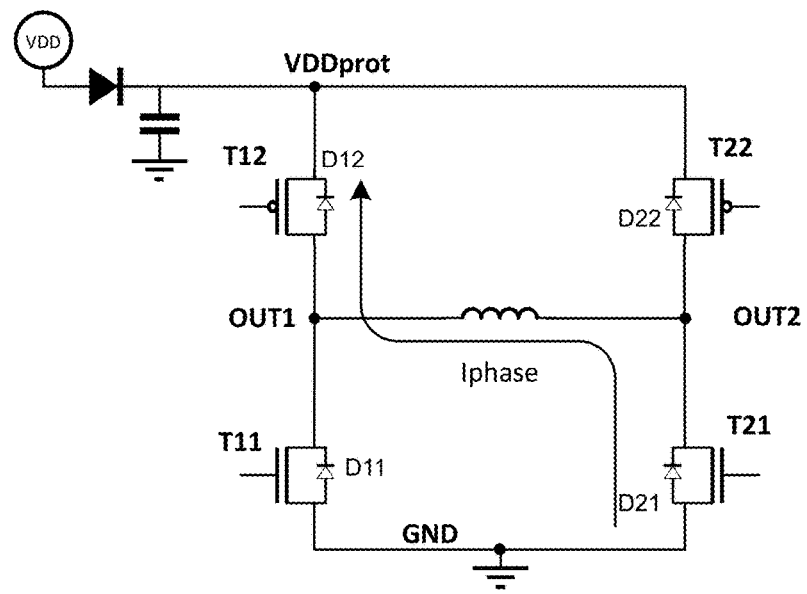
FIG. 10 shows an example wherein the current flowing through the coil can be measured by measuring a reverse voltage over T21 and/or by measuring a reverse voltage over T12.

FIG. 10 shows an example wherein the current flowing through the coil can be measured by measuring a voltage over T21, and/or a forward voltage over D21, and/or by measuring a voltage over T12, or combinations thereof.

Figure 11:
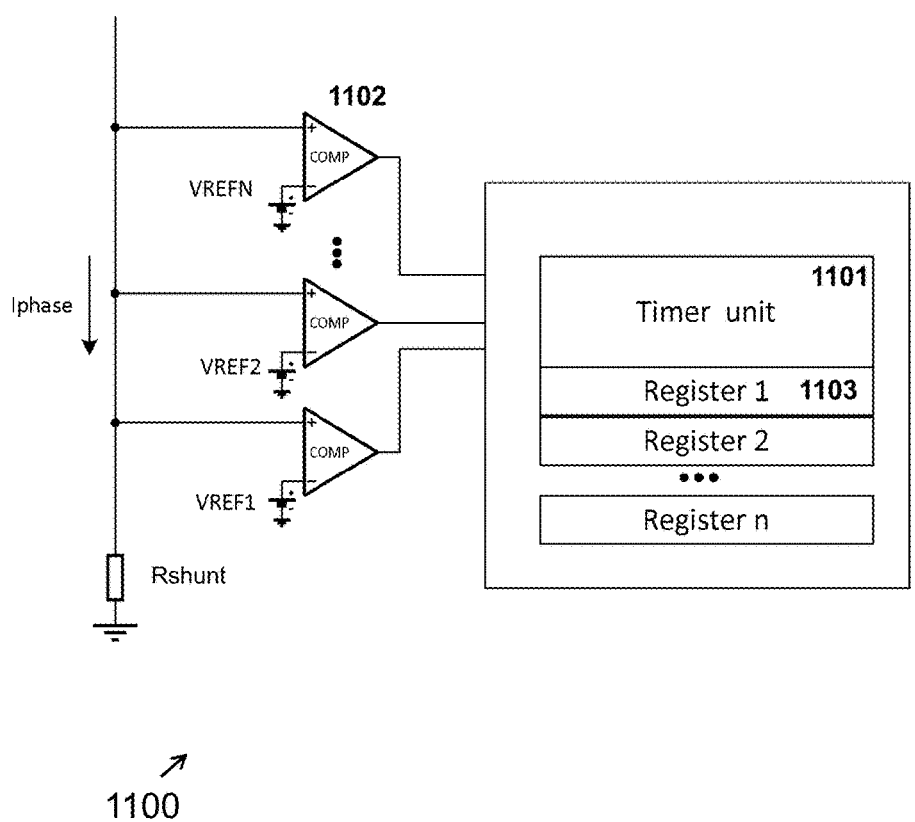
FIG. 11 shows an example of a current monitoring means comprising a plurality of comparators adapted for capturing corresponding time values from a timer unit, and for storing said values in appropriate registers.

FIG. 11 shows an example of a current monitoring means 1100 comprising a plurality of comparators 1102 adapted for capturing corresponding time values from a timer unit 1101 when the signal indicative of the current passes several threshold values, and for storing said values in appropriate registers 1103.

Figure 12:
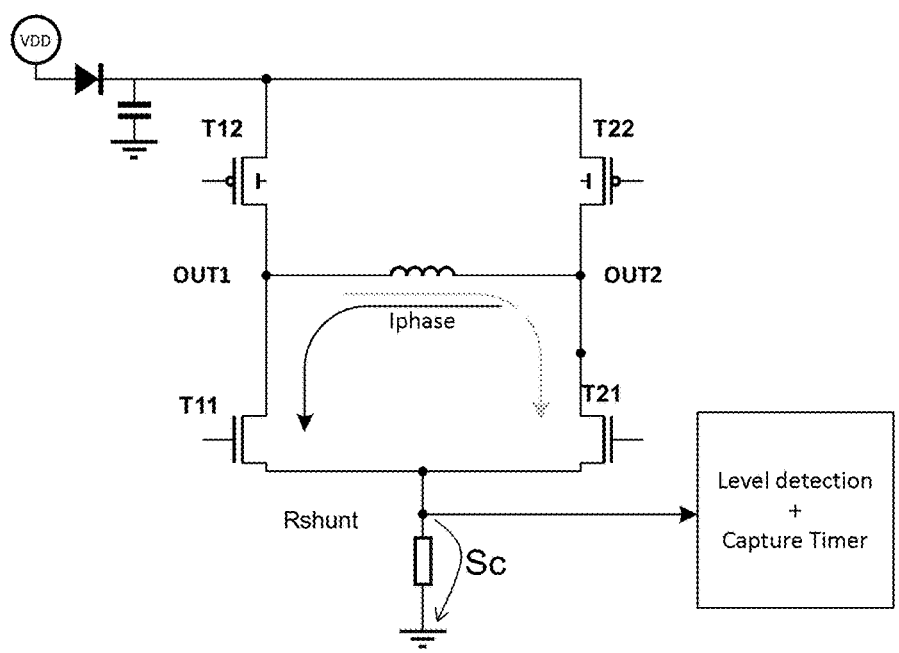
FIG. 12 shows another example of how the current flowing through the coil can be measured, and how the moment(s) in time can be captured when this current passes one or more given threshold value(s), based on a voltage measurement over a shunt resistor, which voltage is compared to said threshold value(s), analog or digital.

FIG. 12 shows another example of how the current flowing through the coil can be measured, and how the moment(s) in time can be captured when this current passes one or more given threshold value(s). In this circuit, the low side transistors are not connected directly to ground, but via a shunt resistor Rshunt, and the voltage SC over the shunt resistor is proportional to the current flowing through the coil. The voltage Sc can for example be digitized using an ADC, or can be compared to one or more predefined levels (e.g. using an analog comparator), and the time at which said voltage passes said one or more levels can be captured by means of a capture timer. As can be appreciated from FIG. 12, the shunt resistor Rshunt can be used to measure the current flowing in either direction (from OUT2 to OUT1, or vice versa).

The invention claimed is:

1. Method of driving a single-coil motor having a stator and a rotor and a coil, the method comprising the steps of:
    a) monitoring a first signal indicative of the rotor position relative to the stator position, and determining a start time when the first signal passes a first threshold level;
    b) at a first time defined as a predefined waiting period after the start time, providing control signals for energizing the coil for causing a current to flow in the coil;
    c) at a second defined as a predefined prediction period after the start time or as a predefined prediction period after the first time, providing control signals for stopping or reducing the energization of the coil for allowing the current flowing in the coil to decrease;
    d) monitoring a second signal indicative of the current flowing through the coil, and determining a third time when said second signal passes a second threshold level; and
    monitoring the first signal, and determining a fourth time when the first signal passes a third threshold level;
    e) updating the prediction period as a function of the third and fourth time to obtain an updated prediction period;
    f) repeating steps b) to e) at least once,
    using the fourth time instead of the start time; and
    using the updated prediction period instead of the predefined prediction period.

2. A method according to claim 1,
    wherein at least one of the first, second, third and fourth threshold value is different from zero, or
    wherein each of the first, second, third and fourth threshold value are different from zero.

3. A method according to claim 1, wherein step c) comprises providing control signals for decreasing the current according to a predefined function selected from the group consisting of: an abrupt function, a linear function, a quadratic function, a third-order polynomial function, a piecewise-linear function, and a sinusoidal function.

4. A method according to claim 1, wherein updating the predicted period comprises:
    increasing the predicted period with the difference between the fourth time and the third time and optionally adding a shift term, or comprises:
    increasing the predicted period with a linear combination of a limited set of differences between a fourth time and a corresponding third time measured in earlier half periods, and adding a shift term.

5. A method according to claim 4, wherein the shift term is a predefined value chosen such that the second signal indicative of the current flowing through the coil will pass said second threshold value at substantially the same moment as the first signal will pass the first threshold level.

6. A method according to claim 5, wherein the shift term is a predefined value.

7. A method according to claim 5,
    wherein the method further comprises determining a motor state time; and
    wherein the shift term is a predefined value dependent on the motor state time.

8. A method according to claim 4, wherein the shift term is a predefined value chosen such that the second signal indicative of the current flowing through the coil will pass said second threshold value at said third moment in time located before the fourth moment at which the first signal will pass the third threshold level.

9. A method according to claim 4, wherein the shift term is a predefined value chosen such that the second signal indicative of the current flowing through the coil will pass said second threshold value at said third moment in time located after the fourth moment at which the first signal will pass the third threshold level.

10. A method according to claim 1, wherein monitoring a first signal indicative of the rotor position comprises monitoring a Hall sensor signal.

11. A method according to claim 10, wherein the first signal is a delayed version of the output of a Hall sensor.

12. A method according to claim 1, wherein monitoring a first signal indicative of the rotor position comprises monitoring a signal that is indicative of the back EMF signal.

13. A method of driving a single coil fan using the method according to claim 1.

14. A drive circuit for driving a system comprising a single-coil motor having a stator and a rotor and a coil, the drive circuit comprising:
    a timer or a counter;
    first monitoring means configured for monitoring if a first signal indicative of a rotor position is larger than or passes a first threshold level;
    second monitoring means configured for monitoring if a second signal indicative of a current flowing through the coil is larger than or passes a second threshold level;
    a memory or registers;
    a controller comprising or connectable to said memory, and to said timer or counter, and to said first monitoring means, and to said second monitoring means, and being adapted for performing the method according to claim 1.

15. A system comprising:
    a single phase BLDC motor comprising said single coil;
    a drive circuit according to claim 14;
    a position sensor as part of the drive circuit or an external position sensor, configured for providing the first signal indicative of the rotor position;

a current sensor as part of the drive circuit or an external current sensor, configured for providing the second signal indicative of the current flowing through the coil.

\* \* \* \* \*